（12）United States Patent
Kim et al.

(10) Patent No.: US 7,664,076 B2
(45) Date of Patent: Feb. 16, 2010

(54) RANDOM ACCESS APPARATUS AND METHOD

(75) Inventors: Jung-Im Kim, Daejon (KR); Byung-Han Ryu, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 714 days.

(21) Appl. No.: 11/301,257

(22) Filed: Dec. 13, 2005

(65) Prior Publication Data

US 2006/0126570 A1 Jun. 15, 2006

(30) Foreign Application Priority Data

Dec. 13, 2004 (KR) ...................... 10-2004-0105076
May 23, 2005 (KR) ...................... 10-2005-0043142

(51) Int. Cl.
*H04B 7/216* (2006.01)

(52) U.S. Cl. ..................... 370/335; 370/342; 370/515

(58) Field of Classification Search ................ 370/335, 370/342, 515
See application file for complete search history.

(56) References Cited

U.S. PATENT DOCUMENTS 6,597,675 B1 * 7/2003 Esmailzadeh et al. ....... 370/335

7,212,809 B2 * 5/2007 Khawand ................. 455/414.1
2008/0130482 A1 * 6/2008 Dabak ........................ 370/206

FOREIGN PATENT DOCUMENTS

EP 1 345 464 A2 9/2003

OTHER PUBLICATIONS

Matthias Schulist & Georg Frank; "Link Level Performance Results for a WCDMA Random Access Scheme With Preamble Power Ramping and Fast Acquisition Indication"; 0-7803-5435-4/99/$10.00 © 1999 IEEE; VTC '99, pp. 2581-2585; 1999).

* cited by examiner

*Primary Examiner*—Barry W Taylor
(74) *Attorney, Agent, or Firm*—Lowe Hauptman Ham & Berner, LLP

(57) ABSTRACT

A random access apparatus for supporting a variety of access service classes includes a radio frequency (RF) transmitting/receiving unit for receiving a preamble introduction broadcasting signal from a base station and transmitting a random access preamble to the base station, an introduction broadcasting signal processing unit for extracting a random access usage relating to M-sequences and hadamard sequences from the received preamble introduction broadcasting signal, a selecting unit for selecting a plurality of M-sequences and a hadamard sequence corresponding to a random access purpose based on the extracted random access usage, and a preamble producing unit for generating the random access preamble using the selected plurality of M-sequences and the selected hadamard sequence.

12 Claims, 2 Drawing Sheets

RANDOM ACCESS APPARATUS AND METHOD

FIELD OF THE INVENTION

The present invention relates to a random access apparatus and method; and, more particularly, to a random access apparatus and method capable of supporting a variety of access service classes through constructing a random access preamble by multiplying a plurality of M-sequences and a hadamard sequence, and performing a random access by using the random access preamble.

DESCRIPTION OF RELATED ARTS

In a mobile communication system, a terminal tries to random access using an access channel for communicating with a base station, reporting its location to the base station when it passes different cells, or responding to the base station when it gets a call from the base station through a paging channel.

The $3^{rd}$ generation partnership project (3GPP), a standardization group of a wideband-code division multiple access (W-CDMA) system, that is an asynchronous mode of third generation mobile communication systems, is performing the standardization of a multimedia broadcast/multicast service (MBMS).

In addition, the IEEE 802.16e standardizes a multimedia multicast/broadcast service (MBS) which is similar to the MBMS of the 3GPP.

Moreover, the $3^{rd}$ generation partnership project2 (3GPP2) is performing the standardization for a broadcast multicast system (BCMCS) which is developed from an EV-DO system to thereby offer broadcasting service through the BCMCS.

As described above, in the mobile communication system, a variety of services such as the multimedia broadcasting service are provided to the terminal.

Meanwhile, when the terminal requests a random access in the W-CDMA system, a priority of the random access is called an access service class (ASC). The ASC is classified into 8 levels, the highest level of the priority is 0 and the lowest level of the priority is 7. The highest level 0 is used for an emergency call such as 911.

A random access channel (RACH) is constructed with a preamble and a message. When the base station acknowledges the preamble transmitted from the terminal, the terminal sends the message. If the terminal does not receive the acknowledgement from the base station when it transmits the preamble with low power, the terminal retransmits the preamble after performing the power ramping.

Herein, the preamble is obtained by multiplying a hadamard sequence and an M-sequence. The hadamard sequence is called signature and there are 16 kinds of signatures. If there is only one kind of signature exist when several terminals request random access simultaneously, the probability of collision between the terminals becomes very high. The probability of collision between the terminals can be decreased by employing the 16 kinds of signatures. Meanwhile, the preamble has 15 slots during 20 ms.

When the terminal requests the random access to the base station, the terminal selects an available signature among the 16 signatures and one slot among the 15 slots according to its priority.

When the base station receives different preambles, the base station considers the received different preambles as transmitted from different terminals and perceives the priority of services which the different terminals tried to access.

On the other hand, when the different terminals use the same preamble, the base station can not receive the random access requests from the terminals since there occurs the collision between the requests.

As described above, in the W-CDMA system, there is a limitation for differentiating the ASC because the W-CDMA system is based on the 15 slots and the 16 signatures. That is, when the ASC is classified into 8 levels and 2 signatures are used at each level, the maximum two terminals having the same ASC can randomly access to one slot.

In addition, since all services have different priority, the base station gives the random access opportunity to the random ASC using a persistence value to thereby differentiate the random access having different priority. For each service, the persistence value of the random access opportunity can be varied according to time. The varying persistence value is introduced by broadcasting of the base station.

Meanwhile, the random access channel is timely separated into a data channel and a random access request channel in an orthogonal frequency division multiple access (OFDMA) system. The random access request is called a ranging in IEEE 802.16. The ranging is classified into an initial ranging, a periodic ranging, a handover ranging, and a bandwidth request ranging.

The initial ranging is an access request of a terminal for acquiring an initial synchronization and controlling a power; the periodic ranging is for maintaining the synchronization and the power; the handover ranging is for handover; and the bandwidth ranging is for requesting a bandwidth.

The ranging uses various sequences as codes, which are generated by one M-sequence PN. However, since the ranging codes are received at different time in the base station according to the distance between the terminal and the base station, the base station can not analyze the M-sequence of the random access ranging transmitted from the terminal. To solve this problem, the initial ranging code and the handover ranging code are transmitted twice to the base station, each ranging (the initial ranging, the handover ranging, the periodic ranging, and the bandwidth ranging) code uses a different M-sequence from the other. The terminals performing the same ranging can select the same M-sequence. However, if the terminals select the same M-sequence, collision can be occurred. Then, the terminals try to access again to the base station when the collision is occurred.

In the MBS service of the IEEE 802.16e, every base station provides the same broadcasting service using the same frequency. On the other hand, in the MBMS of the mobile communication system based on a W-CDMA cell, the base station introduces various services to terminals in a cell and requests the terminals whether they receive the services or not. And, the terminals respond whether they receive the services or not to the base station through the random access.

In case the base station, which supports various services such as multimedia broadcasting, e-commerce, remote education, and medical care, determines a broadcasting channel by inquiring the terminal which broadcasting service (program) it wants to receive, the terminal has to respond to the the inquire of the base station within a predetermined time through the random access.

The MBMS under the standardization now broadcasts individual data in each cell and determines which data channel is used for the broadcasting by inquiring how many terminals receive the broadcasting for each cell.

When the terminals respond to the base station under limited number of preamble codes, there occurs collision of the random access between the terminals. Therefore, there is required a method for avoiding the collision.

However, it is difficult to support a variety of services using the preamble codes which are discussed in the standard of the mobile communication system. Therefore, there are needed the preamble codes capable of supporting the variety of services without increasing the number of symbols of the preamble codes.

SUMMARY OF THE INVENTION

It is, therefore, an object of the present invention to provide a random access apparatus and method for supporting various purposes of random access without collision between terminals through constructing a random access preamble by multiplying a plurality of M-sequences and a hadamard sequence and performing the random access using the random access preamble under the condition of resources of the random access limited.

In accordance with one aspect of the present invention, there is provided a random access apparatus including a radio frequency (RF) transmitting/receiving unit for receiving a preamble introduction broadcasting signal from a base station and transmitting a random access preamble to the base station, an introduction broadcasting signal processing unit for extracting a random access usage relating to M-sequences and hadamard sequences from the received preamble introduction broadcasting signal, a selecting unit for selecting a plurality of M-sequences and a hadamard sequence corresponding to a random access purpose based on the extracted random access usage, and a preamble producing unit for generating the random access preamble using the selected plurality of M-sequences and the selected hadamard sequence.

In accordance with another aspect of the present invention, there is provided a random access method including the steps of a) receiving a preamble introduction broadcasting signal about a random access usage corresponding to a plurality of M-sequences and hadamard sequences from a base station, b) selecting plurality M-sequences and a hadamard sequence corresponding to a random access purpose based on the random access usage and generating a random access preamble with the selected M-sequences and the selected hadamard sequence, c) transmitting the generated random access preamble to the base station, and d) receiving a preamble response signal showing whether a random access is successful or not from the base station.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE INVENTION

Hereinafter, a random access apparatus and method in accordance with the present invention will be described in detail referring to the accompanying drawings.

The random access apparatus in accordance with the present invention generates a random access preamble (preamble in a WCDMA system, ranging code in a IEEE 802.16) using a plurality of M-sequences (pseudo random number (PN) sequence) and a hadamard sequence and transmits the random access preamble through a random access request channel, and the base station receives the random access preamble transmitted from the random access apparatus.

After then, the base station acknowledges whether the random access apparatus is in own cell or sector or not by using a cross correlation function of the M-sequence and the orthogonality of the hadamard sequence, and confirms a priority of the random access and an access service class (ASC).

Hereinafter, two M-sequences will be considered as an example.

First, if a code used in a preamble of a random access request channel in accordance with the present invention is defined as a random access preamble (RAP), the RAP is expressed as follows as:

$$RAP = PN_1 \times PN_2 \times H_N, \qquad \text{EQ. 1}$$

wherein $PN_1$ is a first M-sequence; $PN_2$ is a second M-sequence; and $H_N$ is a hadamard sequence.

Figure 1:
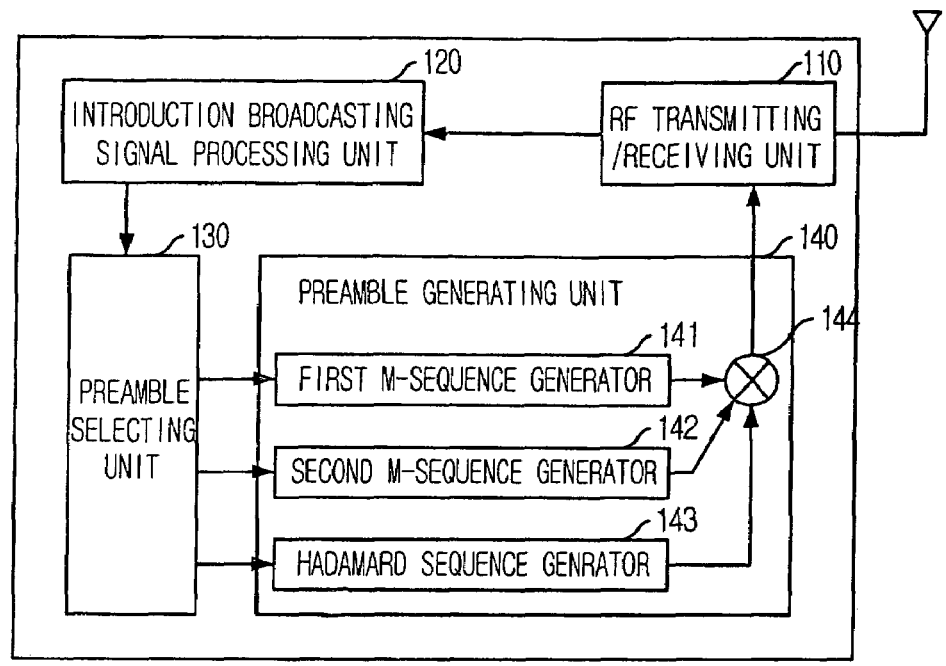
FIG. 1 shows a block diagram of a random access apparatus in accordance with the present invention.

FIG. 1 shows a block diagram of a random access apparatus in accordance with the present invention.

As shown in FIG. 1, the random access apparatus includes a radio frequency (RF) transmitting/receiving unit 110, an introduction broadcasting signal processing unit 120, a preamble selecting unit 130 and a preamble generating unit 140.

The RF transmitting/receiving unit 110 receives a preamble introduction broadcasting signal from a base station and transmits a random access preamble to the base station.

The introduction broadcasting signal processing unit 120 processes the preamble introduction broadcasting signal transmitted from the base station through the RF transmitting/receiving unit 110. That is, the introduction broadcasting signal processing unit 120 analyzes a random access usage for the first M-sequence $PN_1$, the second M-sequence $PN_2$ and the hadamard sequence $H_N$ from the transmitted preamble introduction broadcasting signal.

The preamble selecting unit 130 selects the first M-sequence $PN_1$, the second M-sequence $PN_2$ and the hadamard sequence $H_N$ corresponding to a random access purpose based on the random access usage.

The preamble generating unit 140 generates the random access preamble using the selected first M-sequence $PN_1$, the selected second M-sequence $PN_2$ and the selected hadamard sequence $H_N$.

The preamble generating unit 140 includes a first M-sequence generator 141, a second M-sequence generator 142, a hadamard sequence generator 143 and a multiplier 144.

The first M-sequence generator 141 produces an $n^{th}$-order primitive polynomial M-sequence whose initial value is determined by a first identifier of the base station.

The second M-sequence generator 142 produces an $m^{th}$-order primitive polynomial M-sequence whose initial value is determined by a random number selected by the terminal and a second identifier of the base station. Here, the second M-sequence generator 142 can generate the M-sequence by using the random number without the identifier of the base station.

The hadamard sequence generator 143 produces a hadamard sequence. The generated hadamard sequence represents a priority of random access and an access service class (ASC).

The multiplier 144 generates the random access preamble by multiplying the first M-sequence, the second M-sequence and the hadamard sequence.

The two M-sequences are considered in the present invention in order to diversify identifiers of the base station by classifying the identifiers of the base station into two identifiers.

Since the number of symbols is pre-decided during a determined period of the random access preamble, there is limitation in diversifying the identifiers of the base station by using the predetermined number of symbols. Generally, since a preamble is transmitted to the base station with high power in a CDMA system and, thus, it makes interference to other data channels, the number of symbols of the random access preamble should be small.

In addition, as the number of symbols of the random access preamble becomes larger in an OFDMA system, data cannot be transmitted during the symbol transmitting time. Thus, the number of symbols must be limited. That is, in the OFDMA system, as the number of symbols becomes smaller, more data can be transmitted. On the other hand, as the number of symbols becomes larger, more identifiers of the base station can be transmitted.

In accordance with the present invention, the identifiers of the base station can be diversified by using two M-sequences without increasing the number of symbols as described above.

Figure 2:
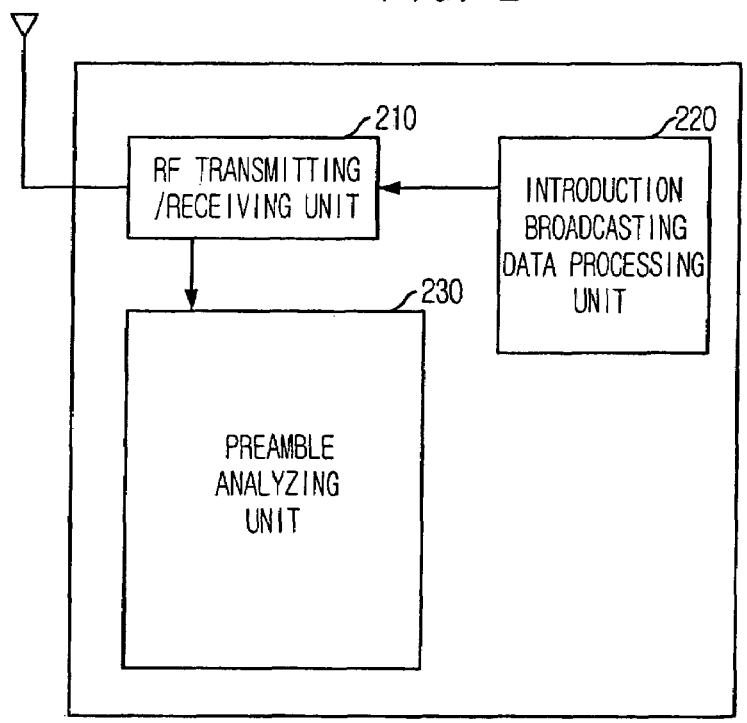
FIG. 2 describes a block diagram of a preamble processing unit of a base station in accordance with the present invention.

FIG. 2 is a block diagram of a preamble processing unit of a base station.

As shown in FIG. 2, the preamble processing unit of the base station has an RF transmitting/receiving unit 210, an introduction broadcasting data processing unit 220 and a preamble analyzing unit 230.

The RF transmitting/receiving unit 210 performs the signal processing for an RF signal having a random access preamble transmitted from the random access apparatus, executes the signal processing for a broadcasting signal which introduces a random access usage for the first M-sequence $PN_1$, the second M-sequence $PN_2$ and the hadamard sequence $H_N$, and transmits a signal processing result to the random access apparatus.

The introduction broadcasting data processing unit 220 selects how to use the first M-sequence $PN_1$, the second M-sequence $PN_2$ and the hadamard sequence $H_N$ according to the random access usage in a cell and transmits data for introduction broadcasting of the random access usage to the RF transmitting/receiving unit 210.

The preamble analyzing unit 230 analyzes a signal outputted from the RF transmitting/receiving unit 210 and verifies whether the random access preamble is received from the random access apparatus or not. If the random access preamble is received, the preamble analyzing unit 230 figures out a random access purpose based on the random access preamble.

Figure 3:
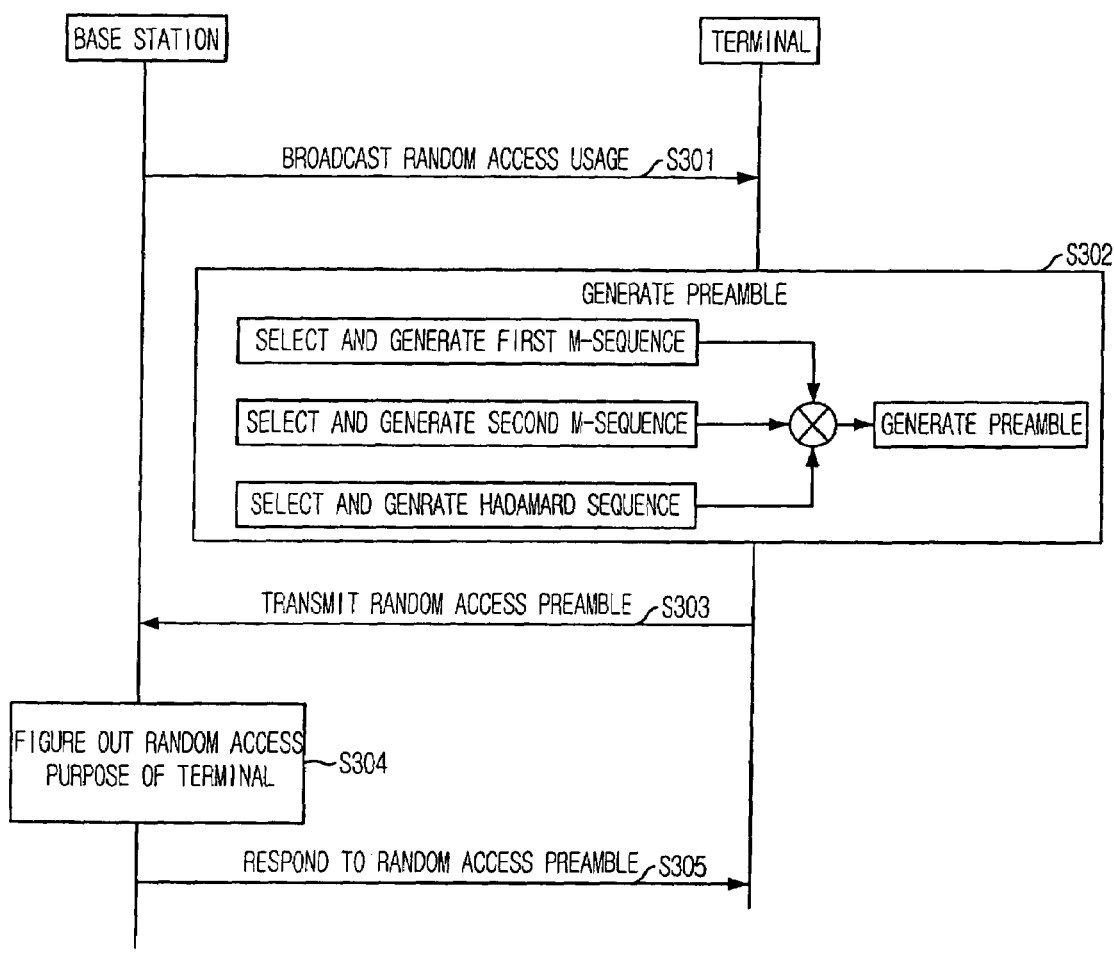
FIG. 3 illustrates a random access method between the random access apparatus and the base station in accordance with the present invention.

FIG. 3 describes a random access method between a random access apparatus of a terminal and a base station in accordance with the present invention.

As shown in FIG. 3, the base station broadcasts the random access usage for each of the first M-sequence, the second M-sequence and the hadamard sequence to the random access apparatus at step S301.

Then, the random access apparatus generates the random access preamble as represented in the equation EQ. 1 at step S302 and transmits the generated random access preamble to the base station at step S303.

In the CDMA (OFDMA) system, when the number of chips (symbols) of the random access preamble is larger than the number of chips (symbols) of the hadamard sequence, the hadamard sequence is transmitted repeatedly in such a manner that a diversity gain of the hadamard sequence is larger than a predetermined value. That is, when the number of chips (symbols) of the random access preamble is larger than the number of chips of the hadamard sequence, a first multiplying result which is obtained by multiplying the one M-sequence and the hadamard sequence is transmitted, then a second multiplying result which is obtained by multiplying the other M-sequence and the hadamard sequence is transmitted repeatedly.

Meanwhile, when the number of chips (symbols) of the random access preamble is larger than the number of chips of any one of the first M-sequence and the second M-sequence, a multiplying result which is obtained by multiplying the M-sequence having smaller number of chips and the hadamard sequence is transmitted repeatedly in such a manner that its diversity gain is larger than the predetermined value.

Then, the base station acknowledges whether the random access apparatus is in its own cell or own sector by using an orthogonal characteristic of the hadamard sequence and a cross correlation function of the M-sequence which are included in the random access preamble, verifies a priority of the random access and classifies an access service class (ASC) at step S304. Namely, the base station figures out the random access purpose of the terminal based on the random access preamble.

Lastly, the base station transmits an acknowledgement signal of the random access preamble to the random access apparatus at step S305.

The step S302 will be described in detail hereinafter.

If the number of symbols of the random access preamble is 96 in the OFDMA system, the random access apparatus can transmit 96 symbols twice when the base station has no information about synchronization and power of the random access apparatus. On the other hand, the random access apparatus can transmit 96 symbols once when the base station has information about the synchronization and power of the random access apparatus.

Each of the 96 symbols of the random access preamble is defined as a $RAP_k$ (k=0~95) and the $RAP_k$ can be expressed as follows as:

$$RAP_k = PN_{1k} \times PN_{2k} \times H_{16, k \%16}, \quad \text{EQ. 2}$$

Wherein the $PN_{1k}$ is obtained by generating a first sequence which is produced by taking an identifier 1 as a cell group number and a multiplied value of the cell group number and 8 as an initial value in an M-sequence $P_1 = 1 + X^3 + X^{10}$, and multiplying the first sequence by −2 and adding 1. The $PN_{1k}$ can be expressed as follows as:

$$PN_{1k} = (1 - 2 \times C_{1, 96 \times identifier1 + k \mod 96}^{10}), \quad \text{EQ. 3}$$

In the meantime, the $PN_{2k}$ is obtained by producing a second sequence that is generated taking an identifier 2 as a cell group number and an initial value as a value made by adding a random number to a multiplied value of the cell group number and 8 in an M-sequence $P_2 = 1 + X^3 + X^7$, a random access code number being an integer from 0 to 8, and multiplying the second sequence by −2 and adding 1. The $PN_{2k}$ can be described as follows as:

$$PN_{2k} = (1 - 2 \times C_{64 + 8 \times identifier2 + RACN, k \mod 96}^{7}),$$
$$0 \leq RACN < 8, \quad \text{EQ. 4}$$

wherein, the RACN means the random access code number.

The base station can introduce a predetermined usage corresponding to the RACN for each service to the random access apparatus.

$H_{16, k \%16}$ is a hadamard sequence which transmits 16 symbols 6 times. The base station can distinguish the random access apparatuses using different hadamard sequences and the same $PN_{1k}$ and $PN_{2k}$ based on the orthogonal characteristic of the hadamard sequence.

For example, an $H_0$ hadamard sequence is used for an emergency call or emergency priority service; an $H_1$ is used for initial synchronization and power control; an $H_2$ is used for reporting a cell change to the base station according to the movement of the random access apparatus; an $H_3$ is used for responding to a paging for downlink data communication; an $H_4$ is used for requesting uplink data communication; and $H_5$ to $H_{15}$ are used for representing whether the broadcasting services introduced by the base station are receive or not.

The base station grants an opportunity to the random access apparatus for random access according to the kinds of the used hadamard sequence and the used persistence value in order to differentiate random accesses having different priorities because all services have different priorities.

If all priorities cannot be represented by using the hadamard sequences and the persistence values, the remained priorities can be represented by using the RACN included in the M-sequence.

For example, if the number of 4096 chips (symbols) of the random access preamble is used in the CDMA system, k is 0 to 4095 in EQ. 2. And, the $PN_{1k}$ is obtained by inputting the identifier 1 into the first M-sequence for each sector to thereby form a first sequence, and multiplying the first sequence by −2 and adding 1. The $PN_{2k}$ is obtained by forming a second sequence based on a random number selected by the random access apparatus, and multiplying the second sequence by −2 and adding 1.

As describe above, the present invention can support a variety of services without collisions between the terminals by diversifying a random access preamble under imited random access resources in a wireless communication system.

The method in accordance with the present invention can be stored in computer-readable recording media (CD-ROM, RAM, ROM, floppy disk, hard disk, and magneto-optical disk).

The present application contains subject matter related to Korean patent application No. 2004-0105076 and 2005-0043142, filed with the Korean Patent Office on Dec. 13, 2004, and May 23, 2005, respectively, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A random access apparatus comprising:
a radio frequency (RF) transmitting/receiving unit configured to receive a preamble introduction broadcasting signal from a base station and to transmit a random access preamble to the base station;
an introduction broadcasting signal processing unit configured to extract a random access usage relating to M-sequences and hadamard sequences from the received preamble introduction broadcasting signal;
a selecting unit configured to select a plurality of M-sequences and a hadamard sequence corresponding to a random access purpose based on the extracted random access usage; and
a preamble generating unit configured to produce the random access preamble multiplying the selected plurality of M-sequences and the selected hadamard sequence, wherein the preamble generating unit includes:
a first M-sequence generating unit configured to generate a first M-sequence having an initial value determined by a first identifier of the base station;
a second M-sequence generating unit configured to generate a second M-sequence having an initial value determined by a random number;
a hadamard sequence generating unit configured to generate a hadamard sequence which represents a kind of a random access service; and
a multiplying unit configured to generate the random access preamble by multiplying the first M-sequence, the second M-sequence and the hadamard sequence.

2. The random access apparatus as recited in claim 1, wherein the second M-sequence generating unit generates the second M-sequence having the initial value determined by the random number and a second identifier of the base station.

3. The random access apparatus as recited in claim 1, wherein, the hadamard sequence represents the kind of the random access service and a priority of the random access service is presented by using a persistence value.

4. The random access apparatus as recited in claim 3, wherein a priority of the random access service is presented by using a random access code number contained in the plurality of M-sequences.

5. A random access method comprising the steps of:
receiving a preamble introduction broadcasting signal related to a random access usage from a base station;
selecting a plurality of M-sequences and a hadamard sequence corresponding to a random access purpose based on the random access usage and generating a random access preamble multiplying the selected M-sequences and the selected hadamard sequence;
transmitting the generated random access preamble to the base station; and
receiving a preamble response signal showing whether a random access is successful or not from the base station,
wherein, in the step of selecting, the random access preamble is generated with two selected M-sequences and the selected hadamard sequence corresponding to the random access purpose based on the random access usage, and
wherein an initial value of a first M-sequence of the two selected M-sequences is determined by a first identifier of the base station and an initial value of a second M-sequence is decided by a random number.

6. The random access method as recited in claim 5, wherein the initial value of the second M-sequence is determined by a second identifier of the base station and the random number.

7. The random access method as recited in claim 5, wherein, the hadamard sequence represents a kind of a random access service and a priority of the random access service is presented by using a persistence value.

8. The random access method as recited in claim 5, wherein a priority of the random access service is presented by using a random access code number contained in the plurality of M-sequences.

9. The random access method as recited in claim 5, further comprising the step of:
when the number of chips (symbols) of the random access preamble is larger than the number of chips (symbols) of the hadamard sequence, repeatedly transmitting the hadamard sequence to the base station in such a manner that a diversity gain of the hadamard sequence is larger than a predetermined value.

10. The random access method as recited in claim 5, further comprising the step of:

when the number of chips (symbols) of the random access preamble is larger than the chip number of any one of the plurality of M-sequences, repeatedly transmitting a multiplying result which is obtained by multiplying the M-sequence having smaller number of chips and the hadamard sequence to the base station in such a manner that a diversity gain of the multiplying result is larger than a predetermined value.

11. A random access apparatus comprising:
a radio frequency (RF) transmitting/receiving means for receiving a preamble introduction broadcasting signal from a base station and transmitting a random access preamble to the base station;
an introduction broadcasting signal processing means for extracting a random access usage relating to M-sequences and hadamard sequences from the received preamble introduction broadcasting signal;
a selecting means for selecting a plurality of M-sequences and a hadamard sequence corresponding to a random access purpose based on the extracted random access usage; and
a preamble generating means for producing the random access preamble multiplying the selected plurality of M-sequences and the selected hadamard sequence,
wherein the preamble generating means includes:
a first M-sequence generating means for generating a first M-seguence having an initial value determined by a first identifier of the base station;
a second M-sequence generating means for generating a second M-sequence having an initial value determined by a random number;
a hadamard sequence generating means for generating a hadamard sequence which represents a kind of a random access service; and
a multiplying means for generating the random access preamble by multiplying the first M-sequence, the second M-sequence and the hadamard sequence.

12. The random access apparatus as recited in claim 11, wherein the second M-sequence generating means generates the second M-sequence having the initial value determined by the random number and a second identifier of the base station.

* * * * *